Patented Feb. 28, 1939

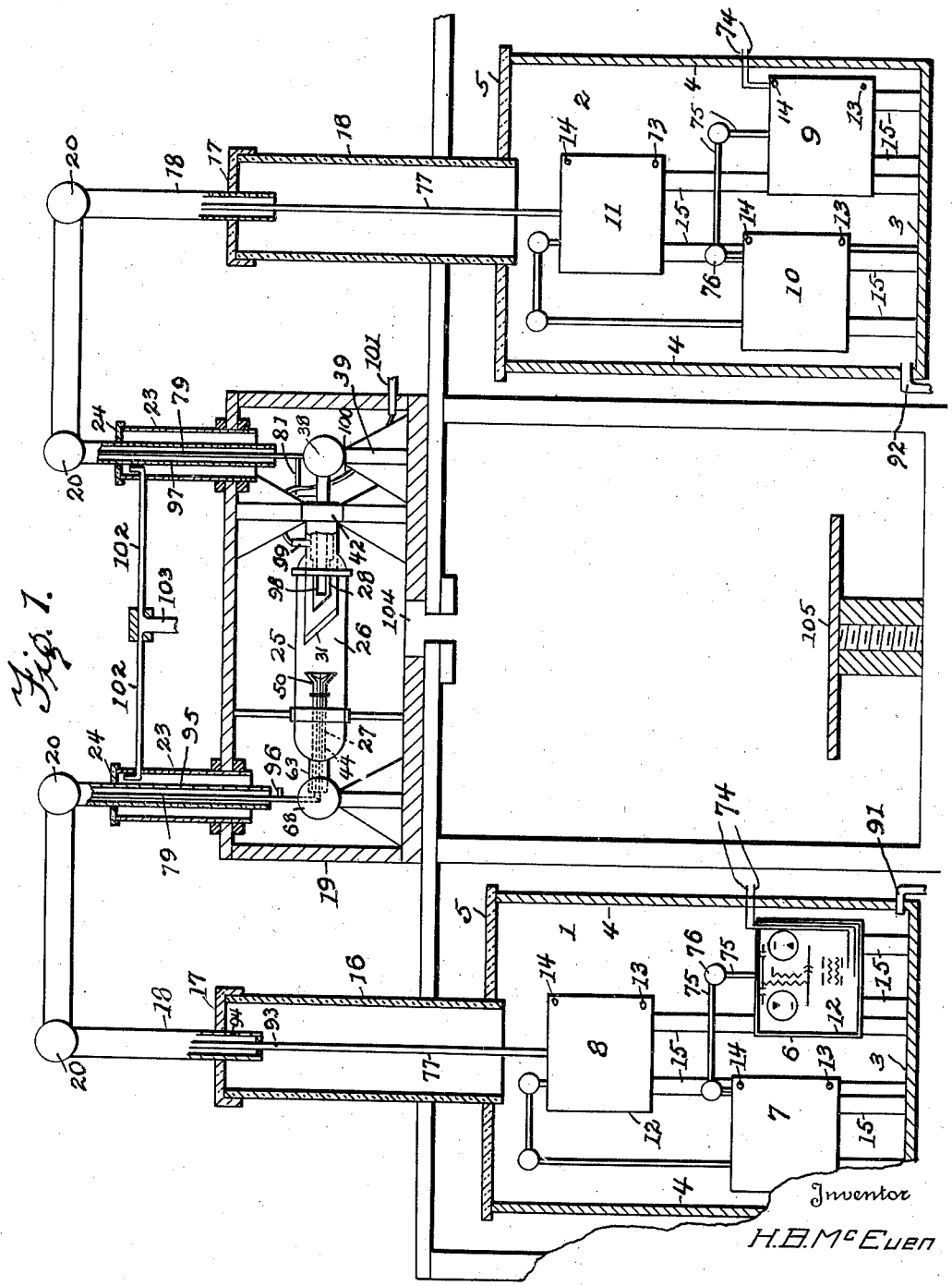

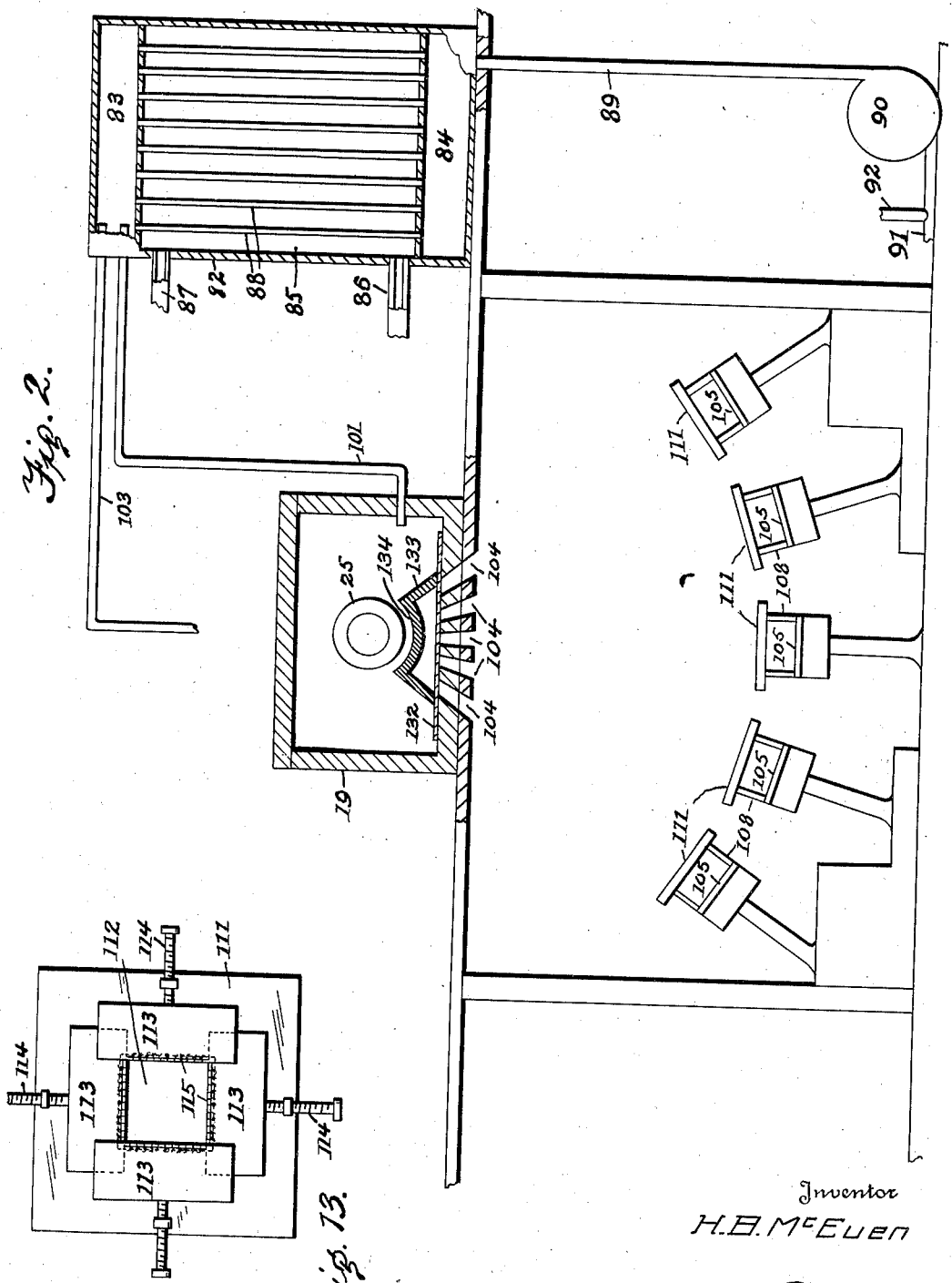

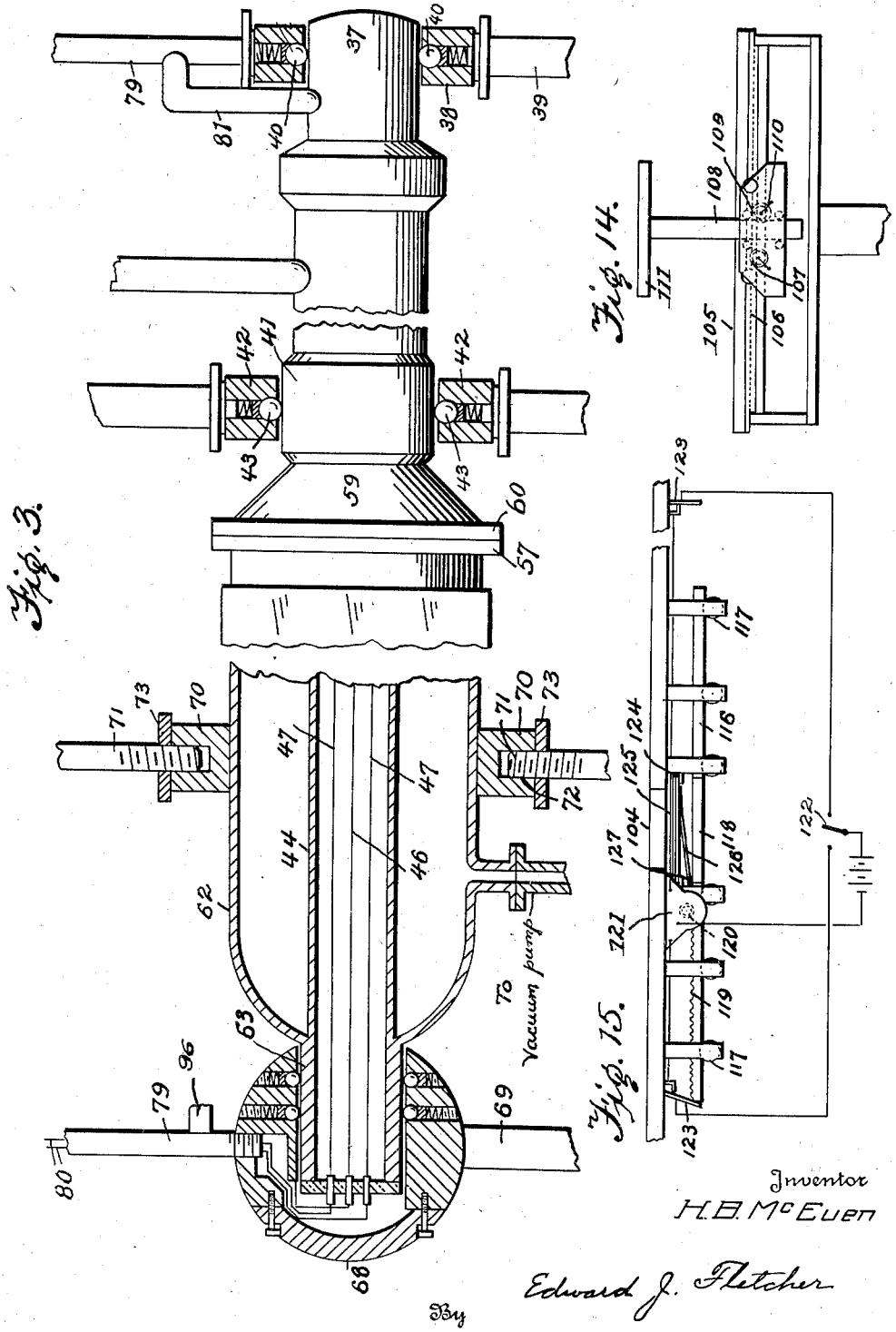

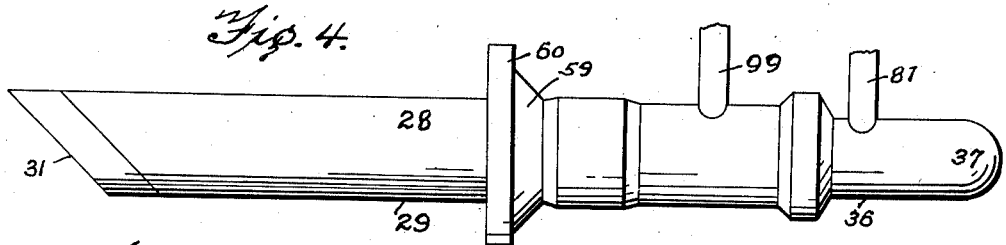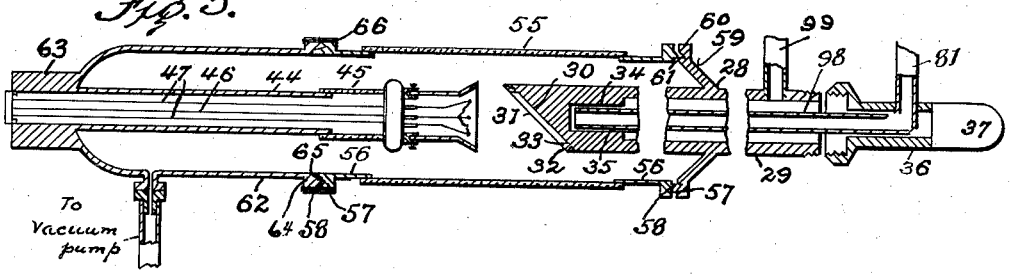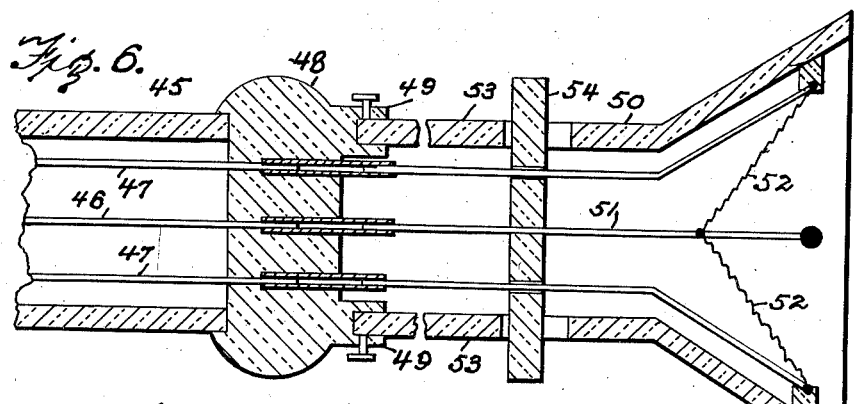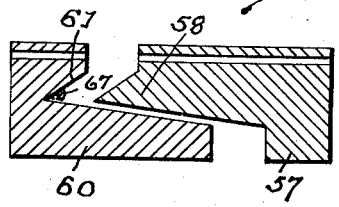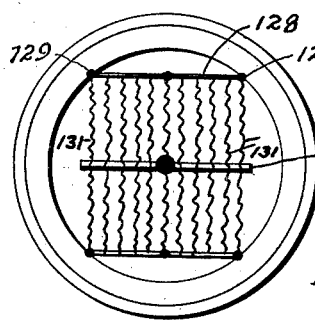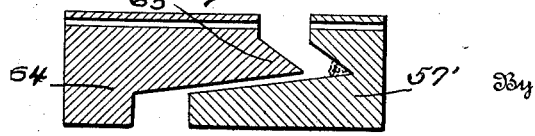

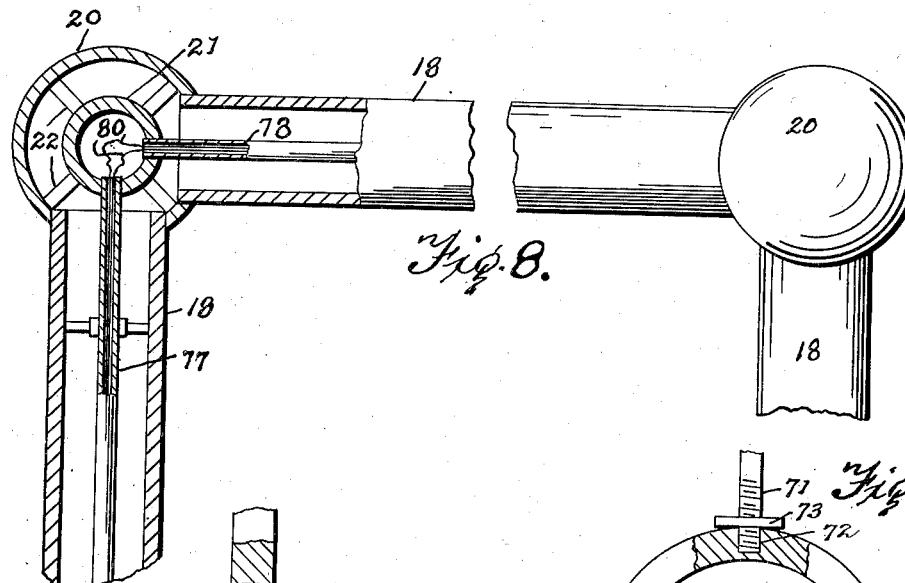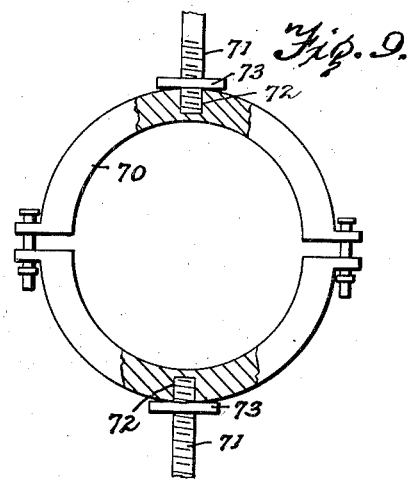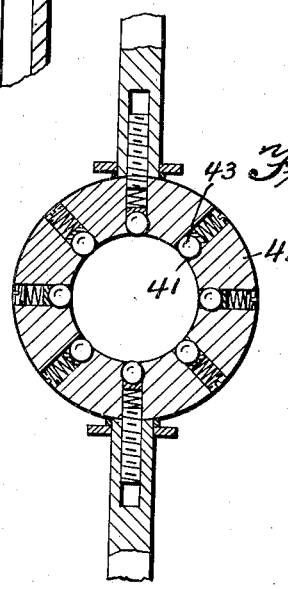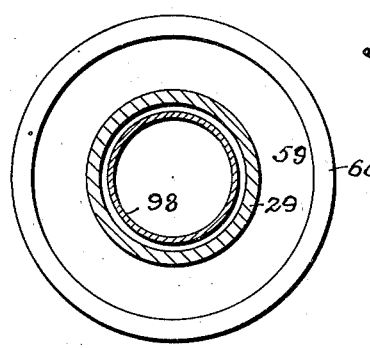

2,148,488

UNITED STATES PATENT OFFICE 2,148,488

X-RAY APPARATUS

Harry B. McEuen, Jacksonville, Fla.

Application December 18, 1933, Serial No. 702,989

3 Claims. (Cl. 250—104)

This invention is directed to an improvement in X-ray apparatus, wherein provision is made for maximum efficiency and the elimination of characteristic faults and disadvantages of the conventional type of such apparatus.

The primary object of the present invention is the provision of an X-ray apparatus of a constant potential cascade type of tube rectification, in which there is provision of means for insulating and cooling of the transformers and rectifier tubes, together with means for lessening and substantially completely suppressing coronal discharge.

A further object is the provision of an X-ray tube designed for use in such an apparatus and which owing to its massive construction and proportions is liable to breakage in transportation, in sectional parts or construction, with means providing for the assemblage and proper connection of such parts for use as will provide for and insure proper efficiency, with the assemblage within the skill of any ordinary mechanic, and with the sectional construction permitting the convenient replacement of any ineffective part or parts without the necessity of the replacement of the entire tube.

A further object of the present invention is the provision of a mechanical support for the X-ray tube, which provides for a balanced relation of the weight of the tube, with a view to avoiding weight strain on the glass or other fragile insulator parts of the tube, with the balanced supporting means particularly arranged to permit relatively free expansion of the tube in a longitudinal direction to compensate for expansion and contraction.

A further object of the invention is the provision of means for adjusting the curvature or concavity of the spiral filament of the cathode, together with means for permitting convenient and individual replacement of the cathode filament and filament portion as a unit; the adjustability of the cathode filament being secured primarily by carrying the high potential lead to the cathode directly to the center of the filament and providing for the longitudinal adjustment of this lead to provide desired variation in the concavity or convexity of the cone.

A further object of the invention is the provision of means for cooling and insulating the entire apparatus, including transformers, rectifier tubes, aerial system, anode, and the external portions of the X-ray tube, with a particular view to effective cooling and the prevention of coronal discharges from any or all such parts.

A further object is the provision of means for treating a number of patients at the same time, with selective controllable provision to interrupt treatment for any patient or patients at will without interfering with the treatment of other patients, the patient receiving tables being equidistant from the focal spot of the apparatus and being adjustable to secure the desired angle of exposure.

The invention in the preferred embodiment of detailed structure, is shown in the accompanying drawings, in which:

Fig. 1 is a view in section, partly in elevation, showing the constructional form and arrangement of the complete apparatus, the cooler for the cooling fluid being omitted.

Fig. 2 is a view in section, partly in elevation, showing the tube house, the relative arrangement of the patient-supporting tables, and the means for cooling the fluid used as a cooling means for the apparatus.

Fig. 3 is an enlarged view in elevation, partly in section, showing the X-ray tube, and illustrating more particularly the mountings for the cathode end and for the anode end.

Fig. 4 is a view in elevation of the anode tube, showing more particularly the balance-bearing surface integral with the tube, and the integral portion of the tube for connection with the X-ray tube casing.

Fig. 5 is a longitudinal sectional view of the X-ray tube, the cooling elements for the anode tube and the arrangement of the removable cathode stem cup being more particularly shown.

Fig. 6 is an enlarged broken longitudinal section of the cathode stem, the removable mounting for the cup and the means for adjusting the filaments of the stem being particularly shown.

Fig. 7 is a transverse sectional view through the elements connecting the cathode and anode ends of the casing to the intermediate insulating section.

Fig. 8 is a view in section, partly in elevation, showing the means for connecting the high-potential lead sections and the means for connecting the insulating tubes, with a view to maintaining electrical continuity of the leads and maintaining uninterrupted circulation in such leads and in the tubes.

Fig. 9 is a vertical sectional view of the fixed clamp bearing for the cathode end of the X-ray tube.

Fig. 10 is a vertical sectional view of the bearing member for use in connection with the anode tube.

Fig. 11 is a transverse sectional view through the anode tube taken immediately in advance of the flange arranged to provide for connecting such anode tube in the sectional construction of the X-ray tube.

Fig. 12 is a face view of the filament cup of the cathode stem, showing a different arrangement of the filaments and supports.

Fig. 13 is a plan view of the diaphragming apparatus for the patient table.

Fig. 14 is a side view of a patient table with the diaphragming apparatus in place.

Fig. 15 is a detail view showing the shutter means for the radiation ports of the tube house.

Fig. 16 is a detail view similar to Fig. 7.

The invention, with more particular reference to Figure 1 of the drawings, wherein a substantially complete assembly is shown, includes a cathode transformer house 1 and an anode transformer house 2. These transformer houses are of substantially identical construction, including a bottom wall 3 and side walls 4, which may be of metal, and a top wall 5 of insulating material, such as Bakelite. In each house is arranged a requisite number of step-up transformers, three such being indicated, and shown at 6, 7 and 8 in the cathode transformer house, and 9, 10 and 11 in the anode transformer house.

The transformers per se may be conventional and are not specifically illustrated, though for the purposes of the present invention it is to be understood that each transformer is mounted in a case 12 formed in or near the bottom with an opening 13 and in or near the top with an opening 14 in order to permit free circulation of the insulating and cooling medium, preferably oil of high di-electric strength, with the primary windings, core and secondaries of the transformer spaced from each other to insure free cooling contact of the cooling medium. Each transformer case is preferably interiorly rounded at the corners and the top of the case constructed of insulating material.

The transformers in each house are in cascade relation and appropriately insulated from the house and from each other, each being supported from the bottom 3 of the house by pillars or like supports 15 which in connection with the particular transformer are constructed with a view to insulating that transformer with particular regard to its current development.

Extending upwardly from the top 5 of each transformer house is a sleeve-like member 16, which is of insulating material and open to the interior of the transformer house with which it is connected, a leak-proof joint being provided at the juncture of such insulating extension with the top of the transformer house. The upper end of each extension is closed by a cap 17, through which extends the lower end of an insulator tube 18. The insulator tube has a nonleaking connection with the cap, is of materially less diameter than that of the extension 16, and depends for a relatively short distance within the extension. The lower end of the insulator tube is closed, except for the passage therethrough of the high potential lead to be hereinafter referred to.

The insulator tube is designed to provide a medium for housing the high potential lead and for directing the circulation of the cooling medium from the transformer housings to and through the X-ray tube house, here indicated at 19. As such tube house is arranged above and intermediate the transformer houses, it is apparent that each insulating tube 18 must be arranged in sections, and that such sections must be connected in a manner to avoid interruption of the passage of the cooling medium, while at the same time protecting the high potential lead. The respective sections of the insulating tube are connected by a junction element, illustrated more particularly in Figure 8, and including a hollow sphere 20 of insulating material and an interior sphere 21 of hollow form supported centrally of the sphere 20 by insulating struts 22. The interior sphere 21 is of materially less diameter than the sphere 20, is formed of conducting material, and is designed to provide the connection, electrical and mechanical, between the high potential lead sections, as hereinafter more particularly referred to.

The exterior sphere 20 is designed to provide an open circulatory connection between the adjacent ends of the insulating tube 18 and such sphere 20 is formed at appropriate points to permit the open communicating connection therewith of the ends of the insulating tube sections, the connection of course being proof against leakage. The tube house 19 is arranged intermediate and above the transformer house and the insulating tube 18 from each transformer house to the tube house is illustrated as provided in sections rising from the insulator house and from the tube house and an intermediate section, with the proximate ends of the sections connected as described. The tube house, which aside from the details hereinafter particularly described, may be of any usual or conventional form and construction, is provided at the cathode and anode end with tubular standards 23 rising from the upper wall of the tube house and in open communication with the interior thereof. These standards 23 have non-leakage juncture with the tube house top wall and are each provided at the upper end above the tube house with a sealing cap 24 through which the final section of the insulating tube 18 extends in a non-leaking manner.

Mounted within the tube house is an X-ray tube, indicated generally at 25, the details of construction of which form a vital and important part of the device. This X-ray tube is made up of a casing 26, a cathode 27, and an anode 28. The anode includes a metallic tube 29 having a forward end wall 30 carrying the target 31, the target being connected to the tube by forming such target with openings 32 through which the material of the tube passes in casting to provide connecting pins 33, as described in my Patent No. 1,993,376, granted Mar. 5, 1935, and which needs no further description herein.

The wall 30 is further formed with rearwardly projecting heat dissipating fins 34 cut away throughout a portion of their lengths to provide a pocket 35 to receive the discharge end of the tube for the cooling medium, which construction is specifically described and claimed in my Patent No. 1,994,140, granted Mar. 12, 1935. The tube 29 remote from the target is provided with a removable bearing end 36, preferably threadedly connected to the tube, with a cylindrical portion 37 supported for free endwise movement in a bearing 38 rigidly secured to an insulated upright 39 rising from the bottom of the tube house and rigidly connected at its upper portion to the lower end of that section of the high potential lead entering the anode end of the tube house.

The bearing-connected end of the insulating tube is closed and the bearing is constructed in any conventional way to provide spring-pressed balls 40 which surround and provide the actual bearing support of, and with freedom of longitudinal movement of, this end of the anode tube. At an intermediate point in its length the anode tube is provided with another bearing, which is hereinafter termed the fulcrum bearing, and which is so arranged and positioned with respect to the tube that the weight of the tube is substantially balanced on the respective sides of the bearing to relieve the glass and other fragile parts of the X-ray tube proper of the weight strain of the anode tube. In providing for the fulcrum bearing, the X-ray tube is provided at appropriate points with a circumferential enlargement 41 and a bearing 42 including the spring-pressed balls 43 is supported from the top and bottom of the tube house, with the balls cooperating with the tube bearing 41.

While a single series of balls 43 are illustrated, the use of any number of series of balls is contemplated for such bearing, as it is important that the anode tube be permitted an extremely smooth, easy, sliding movement to avoid binding and thereby undue stress on the tube in general during expansion and contraction.

The cathode tube or stem is constructed of metal, as at 44, which is cast integral with the metal end of the casing of the X-ray tube, to be later referred to. The operative end of the cathode stem is in the form of a glass or like tube 45 having a glass-metal seal with the tube 44. The high potential lead 46 of the cathode stem and the filament wires 47 of this stem extend therethrough and are embedded in and extend beyond a sealed end 48 of the glass section 45 of the cathode stem. The high potential lead and filament wires are provided beyond the sealed enlargement 48 in any conventional way to permit the mechanical and electrical connection thereto of extensions of these projections, and the sealed end 48 is also provided with sockets 49 of appropriate type. A cup 50 for the operative end of the cathode stem is constructed as an independent element, including the cup-shaped body, centrally within which is arranged a high potential lead 51 and from which extends the filaments 52, with such conductors extending rearwardly to permit the high potential lead and filament wires to be mechanically engaged with the coupling extensions of these conductors within the stem, as previously noted, the cup being also provided with extensions 53 arranged to cooperate with the sockets 49 and be secured therein in any appropriate manner, a glass bar 54 preferably holding all of these extensions in proper relation inwardly of the cup proper.

The high potential lead 51 extends in advance of the filament connection thereto and this section of the high potential lead is designed to be longitudinally adjustable in the glass bar 54 and in the connector extending beyond the seal 48 and forming the terminal of the main high potential lead 46 and by such adjustment to obviously vary the pitch of the filament in concavity or convexity which will at once increase or diminish the focal area or size on the anode.

The present apparatus is designed for very high voltage and high milliamperage, and obviously the X-ray tube proper in such an apparatus must be rather massive in construction and proportions. Incident to this fact, and also to the requirement that the tube must, at least in part, be made up of material which is relatively fragile, the transportation of such a tube as a unit is difficult and burdensome if breakage is to be avoided. Therefore, it is an important part of the present invention that the X-ray tube, and more particularly the casing thereof, may be of sectional construction, constructed with a view to its convenient and ready assemblage when desired for use without the requirement of particularly skilled labor. This sectional formation not only provides for the comparatively easy transportation of the various parts without particular liability of breakage, but also permits the replacement of any of such parts as may be damaged without the expense of replacing the entire tube.

The construction of the tube as a whole, or more particularly the casing thereof, in sectional formation is an important part of the present invention. The casing of the improved tube is, therefore, constructed of an intermediate section 55 of glass or the like, Pyrex glass being preferred, as least porous. This glass section must be of appropriate length for its understood purposes, and is provided at each end with a metallic section 56, the juncture between the glass and metal being necessarily a proper sealing connection. The free ends of the metallic section 56 are exteriorly provided with annular rings 57 having, in the instance shown, an annular, pointed projection 58 on their relatively remote end edges. The anode tube 29 is provided with an outstanding, integral, annular flange 59, the peripheral edge of which is in the form of an annular ring 60 having a recess or channel 61 to accurately receive and fit the projection 58.

The cathode end of the casing comprises a metallic section 62, the end wall of which is formed with an axially extending bearing enlargement 63 through which the cathode stem extends, and with which, together with the casing section 62, the metallic length of the cathode stem 44 is preferably cast as a unit. The end of the metallic casing 62 remote from the bearing enlargement is formed with an annular ring 64 having a projection or recess indicated at 65, to cooperate with the complementary formation in the annular ring 57 on the terminal of the metallic section 56 of the central or glass section of the casing.

In the detail illustrated, the ring 57 at the anode end of the section 55 is formed with the projection 58, while the ring 57 at the opposite end of such section is formed with the recess corresponding to the recess 61 in the projection carried by the anode tube, while the ring 64 on the end 62 of the casing is provided with a projection. Of course, the particular arrangement of these projections and recesses is not of special importance, but if arranged as described there is provided a more convenient and successive end to end assembly of the parts. The rings 64 and 57 are formed beyond the projection of the recesses with appropriate openings to receive tightening bolts 66, whereby the rings and the projections of the recesses may be drawn into intimate sealing contact. In this connection, it is preferred that the contacting parts of these rings including the projections and recesses be carefully machined for accurate interfit, and further that a suitable flux such as silver solder, indicated at 67, be placed in the closed end of the recess in each instance to permit when the parts are assembled and the solder subjected to appropriate heat, the provision of an absolute seal at this juncture.

This construction of the tube casing in sectional form permits its ready make-up and transportation as independent units, and convenient and ready assemblage on the job without necessitating the requirement of skilled labor in such assemblage. Furthermore, by this arrangement any section of the casing with its connected parts constitutes a separable unit, which, if necessary, may be replaced, without requiring the replacement of any other of the associated units. Thus the sectional tube casing materially reduces the liability of damage in handling and transportation otherwise incident to constructing the tube as an entirety in the form of a single unit, and also materially reduces the expense of the replacement of a broken or damaged portion of the casing or tube in comparison with the cost of replacement of the entire tube in those cases where such replacement is necessary in a conventional tube and casing where such repair necessitates replacement of the entire unit.

The cathode end of the casing or more particularly the enlargement 63 is supported in a bearing 68 carried on the upper end of an appropriately insulated pillar 69 supported by the floor of the tube house. The cathode end of the tube casing is further supported in semi-annular supports 70 carried by posts 71 secured to the top and bottom walls of the tube house, the posts terminally seating in openings 72 in the bearing segments 70 and threaded to receive adjusting nuts 73 by which the clamping cooperation of the segments 70 with the casing section 62 may be adjusted to insure a fixed clamping support of the casing at this point.

The transformers in the respective transformer houses are arranged in series connection to progressively step up the voltage of the current. The initial transformer 6 and 9 in the respective instances are served by main conductors 74 leading through one wall of each transformer housing. The respective leads for the high potential current from one transformer to the next are in the form of hollow pipe sections 75 of electrical conductivity, provided for convenience in straight tube sections connected at their juncture by joining members 76 similar, for example, to the interior spherical member 20 of the joining connections of the insulator tube 18. The high potential lead from the final transformers 8 and 11 respectively is in the form of a hollow pipe section 77 of electrical conductivity which extends upwardly through the hollow extension 16 through the closed lower end of the initial section of the insulator tube 18 and is terminally and electrically connected to the inner sphere 21 of the joining member at the upper end of the initial insulator tube section. Successive sections of the high potential lead indicated at 78 and 79 extend through the successive sections of the insulating tube 18 and appropriate jointing connections. The final section of the high potential lead at the cathode end extends through the lower closed end of the final section of the insulator tube 18 and is supported in the bearing member 68 at the cathode end of the X-ray tube casing, such high potential lead being, of course, in electrical connection with the high potential conductor 46 of the cathode stem. The filament conductors 80 lead from the final filament transformer through the hollow high potential lead sections 77, 78 and 79 to the filament conductors 47 of the cathode stem.

The respective sections 77, 78 and 79 at the anode end of the apparatus are similar to that described in connection with the cathode end, except that the final section of the hollow high potential lead 79, which as previously stated is connected to the bearing 38, is above such bearing provided with a lateral extension 81 which is mechanically and electrically connected with the anode tube, preferably with the section 36. Of course, there are no filament leads necessary in the high potential lead at the anode end of the apparatus.

It is to be particularly noted that the high potential lead is of tubular formation and that its various sections are connected to provide uninterrupted communication between such sections. This is important for this high potential lead is to be utilized, as will later appear, as a conduit for the flow in part of the cooling medium. Therefore, it is to be understood that this high potential lead is to be of such character and of such diameter as will provide for its service as a conduit for the cooling fluid as well as for its service as an electrical conductor.

The cooling system preferably utilizes as the cooling medium oil of high dielctric strength designed to travel in closed circulation from an external source of supply, preferably artificially cooled, and the details of which form no material part of the present invention. For convenience in a more complete understanding of the invention there is illustrated an artificially cooled source of supply in Figure 2, where at 82 is a closed tank having an upper compartment 83 for receiving the hot oil of circulation and a lower compartment 84 from which artificially cooled oil is delivered to the system. An intermediate chamber 85 is arranged as a cooling chamber and may, for instance, receive cool water under pressure through a bottom inlet 86 and discharge the same through an upper outlet 87. The oil chambers 83 and 84 are connected by tubes 88 which pass through the water chamber to cool the oil.

The cooled oil is delivered from the chamber 84 by gravity or otherwise through a pipe 89 to a pump 90, and from the pump through pipes 91 and 92 to the cathode transformer house and anode transformer house respectively, the entrance of the oil being at the extreme lower end of the respective houses. The oil circulates in the houses through the transformer casings, by openings 13 and 14, and rising in the tubular extension 13 enters the section 77 of the hollow high potential lead through openings 93 formed in the wall thereof. The oil rising in the extension 16 also enters the insulating tube sections 18 through an opening 94. As the high potential leads and the insulating tube sections at each end of the apparatus are in open communication, the cooling medium is forced to flow therethrough to the tube house. It will be remembered that at both the cathode and anode ends the ends of the insulating tube within the tubular extensions 16 and 23, that is the inlet and exit ends of the insulating tube in the direction of circulation, are closed, and it has been stated that the cooling medium enters the inlet end of the insulating tubes through the openings 94. The exit end of the insulating tube 18, that is the end within the tubular extension 23 of the tube house, is formed with a small opening or openings at 95 (not shown) open to the tubular extension 23 at the cathode end of the apparatus, thus discharging the cooling medium into the tube house. The final section of the high potential lead at the cathode end of the apparatus is also formed with an outlet 96 through which the cooling medium flowing through such high potential lead is also delivered into the tube house.

The final section of the insulating tube 18 within the tubular extension 23 at the anode end of the tube house is formed with an opening 97 (not shown) similar to and for the same purpose as the openings at 95. The high potential lead section 79 at the anode end of the apparatus discharges its cooling medium through the connector 81 into a cooling tube 98 which extends longitudinally of the anode tube and has its discharge end within the pocket 35 formed by the fins 34, as described in the copending application referred to. The cooling medium delivered to the pocket in the anode tube is delivered through such tube and to an outlet 99 connected by a flexible non-conducting pipe section 100 to a pipe 101 leading through the wall of the tube house to the chamber 83 of the cooling apparatus.

The tube house is provided with overflow pipes 102 opening upwardly at the extreme upper end of the tubular extensions 23 and communicating in a common discharge 103 which leads to the chamber 83 of the cooler. Pipe sections 102 are of insulating material, while the discharge connection 103 may be metallic if desired.

The amount of cooling fluid delivered to each transformer house is slightly in excess of the amount that can be taken care of by the openings 93 in the high potential lead, thereby providing a sufficient amount of cooling fluid which will find its way through the openings 94 in the insulator tubes, circulate through these tubes, and be delivered to the tube house. This arrangement provides circulation of oil for insulating purposes around the high potential leads and absolutely prevents coronal discharge, the cooling medium being, of course, at ground potential. Through the same circulation the X-ray tube proper is effectedly cooled and insulated while the target of the anode tube, in natural region of extreme high heat, is more directly and positively cooled through the described circulation of the cooling medium. There is in this particular detail an effective cooling of the transformer houses and the transformers, through the aerial systems, insulating it and preventing coronal discharge, through the X-ray tube house insulating and at the same time cooling the external portions of the X-ray tube proper and more directly and effectively the interior of the anode tube, with the cooling medium in closed forced circulation, at ground potential, and subject to effective cooling beyond the apparatus. Effective cooling, insulating and prevention of coronal discharge is thus efficiently provided for and carried out. Of course, while preferring oil of high dielectric strength as the cooling medium, the invention contemplates the use of any other suitable or appropriate liquid for this purpose, and no limitation is intended in either the relative sizes, diameters or materials making up the respective parts so long as they possess the characteristics required.

The X-ray tube house 19 has its wall constructed of lead and sheet iron of sufficient thickness to prevent stray radiation, and the bottom of the tube house is formed with a series of radiation ports 104. These ports are arranged along the radial axis from the center of the focal area on the anode, and arranged below the tube house, and on the same radial plane of curvature, are provided patient-treating tables 105. These tables may be, except as hereinafter provided, of conventional form, though the use of a table of any desired type is contemplated. The tables are of course to be constructed as to be capable of adjustment in all directions, as is usual.

Each table is provided with diaphragming apparatus adjustable to control the maximum area of the patient to be subjected to treatment in a single exposure. This apparatus includes a frame 106 mounted for movement longitudinally of the table and controlled in this movement through a gear and rack connection 107 operated by a handle. Mounted for vertical adjustment in this frame on each side of the table is a standard 108, having rack and pinion control 109 through a handle 110. The standards support a plate 111 formed with an opening 112 of maximum size. Supported on the plate 111 are four plate-like sections of lead 113, two of the plates being directly supported on the plate 111, and the remaining lead sections supported on the first two. These sections 113 are mounted for adjustment through threaded rods 114 and movable relatively to vary the size of the opening 112. Each plate-section 113 is preferably provided with scale marks 115 on its edge to insure accuracy of adjustment. Through the use of these shield sections the port through which the rays reach the patient may be accurately determined as to size, and thus the surface area of treatment on the patient regulated with absolute certainty. Of course the longitudinal adjustment of the plate 111 through movement of the frame 106 arranges the port at any point on the patient's body, while the vertical adjustment facilitates the positioning of the diaphragming apparatus with regard to the size of the patient.

Each port 104 is provided with a controlled shutter through which the port may be closed or opened. These shutters are identical for each port, and include a rectangular frame having side edges 116 slidably supported by rollers 117 or other means, and which is centrally provided with a shutter plate of lead 118. The frame in both directions beyond the flat shutter plate is of skeleton or open form, and one or both side edges of the frame are provided with racks 119, which are engaged by pinions 120, driven by a reversible motor 121. The respective circuits for the motor are controlled by a switch 122, and each circuit includes a normally-closed switch 123, the movable member of which is arranged in the path of travel of the frame 116, so that as the frame reaches a limit position in either direction the circuit energizing the motor for that drive is automatically opened and the motor stopped. The pinions 120 and the motor 121 are supported by the bottom of the tubing housing.

The bottom of the tube house on each side of the port or ports 104 is provided with narrow shelves 124, to support appropriate filters 125, which are thus removable and applicable at will. A cloth curtain 126 is attached at one end to one of the filters or shelves, with its free end having a rod 127. The curtain is of a width approximating the opening in the frame 116 beyond the shutter plate, and as the frame is moved to open the port 104, the free end of the curtain will fall through the frame, leaving the curtain suspended in view. The curtain is intended to be provided with data indicating the type and character of the filter used, together with any other desirable information. The depending curtain then advises the operator that the particular port is open and the type and character of filter employed with that port.

In Fig. 12 there is shown a slightly different form of filament cup for the cathode stem. The filament leads are electrically connected to bars 128, terminally connected to insulating supports 129 in the cup. The high potential lead is connected to a central bar 130, and filament spirals 131 are terminally welded to bars 128 and centrally welded to bar 130, the filaments being in substantially parallel arrangement.

It is to be noted that the transformers are mounted on end, their primary windings, cores, and secondaries being at a right angle to the usual arrangement, and the parts are sufficiently spaced to permit free circulation of the cooling medium. Furthermore, in connection with the cooling system, it is preferred, though not particularly illustrated, that all sharp corners of any part will in practice be rounded to form smooth spheroid surfaces, thus further providing against coronal discharge.

An X-ray apparatus constructed as described insures perfect cooling of the entire apparatus; prevents coronal discharge from any parts of the entire apparatus; and provides perfect insulation of all parts, including the aerial system. The construction further provides a sectional X-ray tube proper, which may be shipped to its point of use in disassembled condition in two or more parts, and assembled in a simple and expeditious manner, without necessitating skilled labor, thereby avoiding damage liability during transportation, and permitting replacement of any one part without the expense and loss of time and labor incident to the replacement of the entire tube. The disclosure also provides for convenient renewal and adjustment of the filaments of the cathode stem; and counterbalances the weight of the anode tube to relieve the X-ray tube of material weight strain, otherwise incident to conventional construction.

The construction includes a permanent filter 132 of aluminum covering the floor of the tube house. The invention also contemplates a hollow, rectangular element 133, having a bottom area to cover all radiation ports 104, and shaped at the top to conform to the cylindrical portion of the tube casing and spaced therefrom, as at 134. This element 133 is preferably of Pyrex glass, and in its use the exit of rays through the floor of the tube house will have the same amount of filtration in oil and of glass. Optionally, this element 133 may be electrically connected to the glass wall of the X-ray tube casing for the discharge of static electricity, though of course the element is in no way connected to the high potential at the anode or cathode ends of the X-ray tube.

Without specific statement to that effect, it is to be understood that the various materials employed in connection with the described construction are or may be selected with due regard to the desired function of the part, and to this end any and all appropriate materials are contemplated.

What is claimed as new, is:

1. An X-ray tube including a casing comprising a metallic cathode carrying section, a metallic anode carrying section, an intermediate glass section having metallic end portions, means for sealingly interfitting the metallic end portions of the glass section to the ends of the cathode and anode sections, and bolts for maintaining or permitting separation of such sealing interfit, whereby the sealing interfit may be disconnected and restored without impairing the seal.

2. An X-ray tube including a cathode-stem section of metal, an insulating section connected to and forming an extension of the metal section, a sealing member closing the end of the insulating section, a hollow metallic connector embedded in the sealing member, an insulating cup carried by and removably connected to the sealing member, and a high potential lead extending to and fixed within the connector, said lead extending to and within the cup with one end slidably in the connector.

3. A construction as defined in claim 2, wherein additional connectors in the sealing member provide for the support of the filament leads, the terminals of the filament leads being secured within the cup and connected to the high potential lead by filaments.

HARRY B. McEUEN.